United States Patent [19]
Johnson

[11] Patent Number: 5,291,708
[45] Date of Patent: Mar. 8, 1994

[54] MODULAR FRAMING SYSTEM

[75] Inventor: Victor G. Johnson, Miami Shores, Fla.

[73] Assignee: Packer Plastics, Incorporated, Lawrence, Kans.

[21] Appl. No.: 951,880

[22] Filed: Sep. 28, 1992

[51] Int. Cl.$^5$ ............................................. E04B 1/00
[52] U.S. Cl. .................................. 52/282.2; 52/239;
52/71; 47/33; 256/24; 403/171
[58] Field of Search .................. 52/282.3, 282.1, 282.2,
52/284, 70, 71, 64, 169.13, 646, 275, 239; 47/33;
256/24–27, 30–33, 73; 403/170, 171, 172, 173

[56] References Cited

U.S. PATENT DOCUMENTS

| | | | |
|---|---|---|---|
| 286,182 | 10/1883 | Dickerson | 256/32 |
| 2,219,870 | 10/1940 | Jacobus . | |
| 3,415,013 | 12/1968 | Galbraith . | |
| 3,454,262 | 7/1969 | Romano | 256/24 |
| 3,841,042 | 10/1974 | Siegal | 52/282.2 |
| 3,865,309 | 2/1975 | Greenhalgh | 47/33 |
| 3,933,311 | 1/1976 | Lemelson | 47/33 |
| 3,968,617 | 7/1976 | Hodge | 52/282.2 |
| 4,576,364 | 3/1986 | O'Fearna | 256/73 |
| 4,735,397 | 4/1988 | Degagne . | |
| 4,951,440 | 8/1990 | Staeger . | |
| 4,968,171 | 11/1990 | Shell | 52/282.1 |

FOREIGN PATENT DOCUMENTS 2922129 12/1980 Fed. Rep. of Germany .......... 47/33

Primary Examiner—Carl D. Friedman
Assistant Examiner—Winnie Yip
Attorney, Agent, or Firm—Kokjer, Kircher, Bowman & Johnson

[57] ABSTRACT

A modular framing system having a plurality of framing units between which panels may be retained. Each framing unit includes a main body having a plurality of circumferentially spaced receiving chambers having semi-circular configuration. One or more panel retainers may be connected to the main body, each including a panel cup and a chamber rod. The chamber rod is a which may be lowered into one of the receiving chambers to connect the panel retainer to the main body. The chambers have an angular extent less than that of the chamber rods, such that the rods and panel cups may be rotated to the desired angular position with respect to the main body. Each of the panel cups is adapted to receive a lower corner of a panel. With this arrangement two frame units may be located at spaced positions, with the panel cups of associated panel retainers opening towards each other to support the panel. The framing units may include a stake for driving into the ground. The units may also include a cap upon the main body to fix the chamber rods to the main body. The framing units may include a stacking pin rather than the integral stake to allow mounted upon the top of another of the framing units in a stacked configuration. This will allow multiple levels of panels to be retained, allowing bins and other fencing type arrangements to be built.

10 Claims, 3 Drawing Sheets

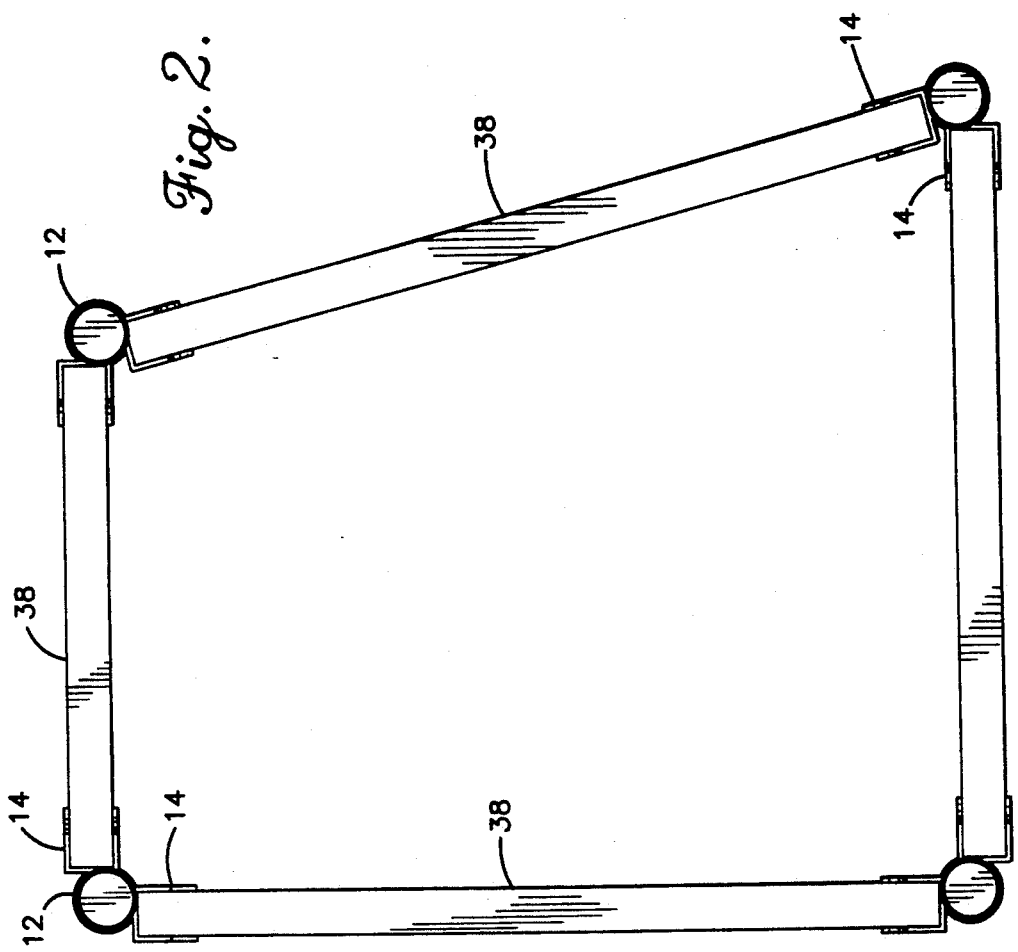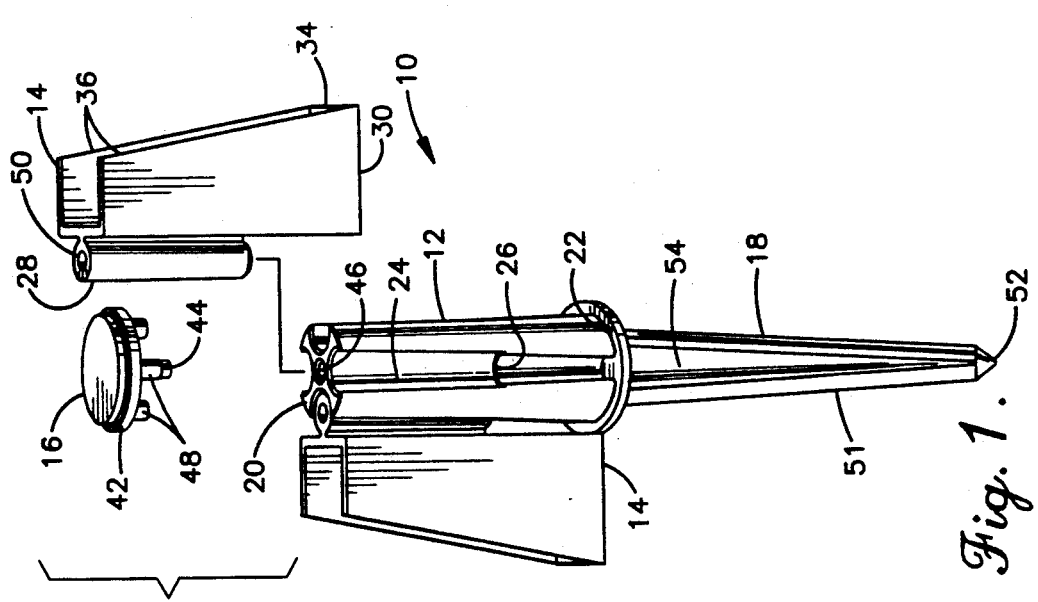

MODULAR FRAMING SYSTEM

BACKGROUND OF THE INVENTION

1. Field of the Invention

The present invention relates in general to structural framing systems. In particular, the present invention relates to an improved modular element for supporting panels therebetween.

2. Description of the Related Art

Low level (i.e. not having a great height) and relatively light duty retaining walls are employed in numerous situations. For example, landscaping, fencing, and slab concrete forms.

In landscaping, it is known to employ sections of railroad ties, seasoned lumber and other similar materials to form low to medium height partition walls to create beds for plantings. This has been rather difficult, however, as the ties and lumber must be provided with a connecting rod extending downward through the ties, vertical support elements nailed to the lumber or other similar arrangements which are relatively costly in terms of labor and effort. Additionally, it is difficult to place the ties or lumber in arrangements having angles other than zero degrees or ninety degrees.

In the formation of fencing, such as that which might be used to retain material within a small space to create a compost bin, similar problems are experienced. Specifically, a relatively simple fencing system requires a relatively high output of time and effort to sink corner supports in the ground, and secure siding elements to these corner supports. In a similar manner the formation of slab concrete forms is a labor intensive process, also involving the driving of supports and connection of sidewalls to the supports, typically by nails, to define the form.

SUMMARY OF THE INVENTION

It is an object of the present invention to provide a framing system which allows panels to be placed in an erect configuration quickly and easily.

Another object of the present invention is to provide such a framing system which is modular in nature.

Yet another object of the present invention is to provide such a framing system which allows the panels to be placed at any relative angle desired.

Yet another object of the present invention is to provide such a framing system which may be stacked in the vertical direction to increase the height of the partition formed with the framing system.

These and other objects are achieved by a modular framing system having a plurality of framing units between which panels may be retained. Each of the framing units includes a main body having a plurality of circumferentially spaced receiving chambers, which have a vertically oriented semi-circular configuration. One or more panel retainers may be connected to the main body. Each of the panel retainers includes a panel cup and a chamber rod. The chamber rod is a vertically oriented cylindrical member having a diameter substantially equal to that of the receiving chambers. The chamber rod may be lowered into the desired one of the receiving chambers to connect the panel retainer to the main body. The semi-circular receiving chambers have an angular extent less than that of the chamber rods, such that the rods, and thus the panel cups, may be rotated to the desired angular position with respect to the main body. Each of the panel cups includes a plurality of walls and is adapted to receive a lower corner of a panel. With this arrangement two frame units may be located at spaced positions, with the panel cups of associated panel retainers opening towards each other. A panel may thus be inserted within the two panel cups, with each framing unit serving to support the panel. The framing units may include an integral stake member such that the framing unit may be readily driven into and fixed in the ground. The units may also include a cap which fits upon the main body and extends over the upper open ends of the receiving chambers to fix the chamber rods, and thus the panel retainers to the main body. The cap may include retaining pins which are received within mating holes in the chamber rods to further secure the panel retainers in position. Certain ones of the framing units may include a stacking pin rather than the integral stake. Such framing units may be mounted upon the top of another of the framing units such that they are in a stacked configuration. This will allow multiple levels of panels to be retained, allowing bins and other fencing type arrangements to be built.

BRIEF DESCRIPTION OF THE DRAWINGS

The objects and features of the invention noted above are explained in more detail with reference to the drawings, in which like reference numerals denote like elements, and in which:

FIG. 1 is an exploded perspective view of a framing unit according to the present invention;

FIG. 2 is a plan view of an enclosure including the framing units according to the present invention;

DETAILED DESCRIPTION OF THE INVENTION

Figure 3:
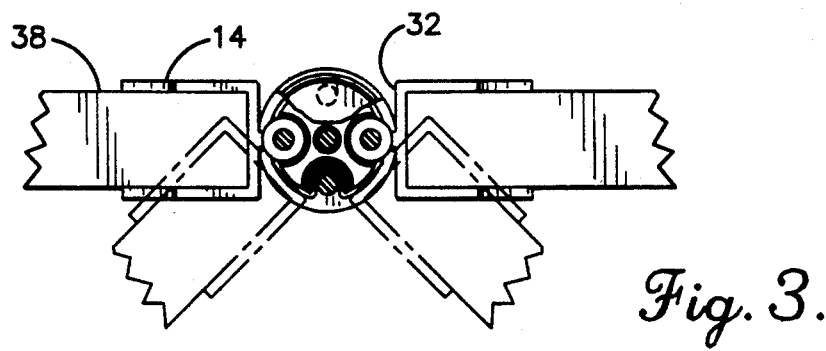
FIG. 3 is detailed plan view in partial cross section of a framing unit according to the present invention.

With reference to FIG. 1, a framing unit according to the present invention is generally designated by reference numeral 10. The framing unit generally consists of a main body 12, one or more panel retainers 14, a cap 16 and means 18 for securing the framing unit against movement.

Figure 4:
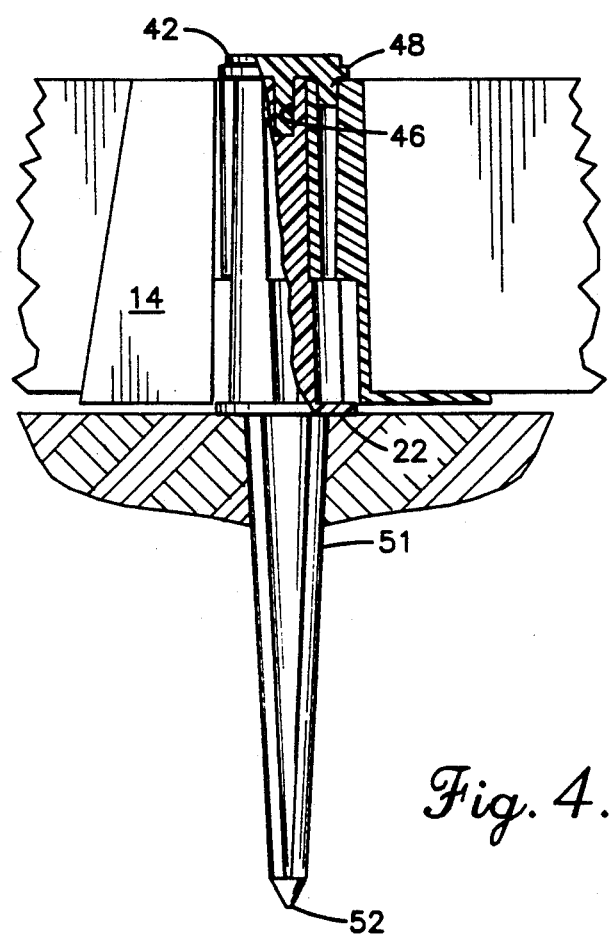
FIG. 4 is a side view in partial cross section of the framing unit of FIG. 3.

As is best shown by comparison of FIGS. 1, 3 and 4, the main body 12 is a substantially cylindrical member having a substantially vertical longitudinal main axis, and a top end 20 and bottom end 22. The main body includes a plurality of receiving chambers 24 at circumferentially spaced locations. In particular, it is preferred that there be four receiving chambers spaced at equal distances about the periphery of the main body.

The receiving chambers open onto the top end 20 of the main body and have a substantially cylindrical configuration, as is best shown in FIG. 3. The longitudinal axis of each of the cylindrical receiving chambers 24 is spaced radially inward from the outer periphery of the main body 12 by a distance less than the radius of the receiving chamber. As such, each of the receiving chambers also includes a longitudinal opening to the outer periphery of the main body, and each of the receiving chambers has an angular extent less than 360 degrees. The importance of this reduced angular extent will be discussed more fully below.

Each of the receiving chambers has a closed lower end for reasons noted below. In the preferred embodiment this closed lower end is formed by a ledge 26 which extends radially inward of each of the receiving chambers 24. The use of a ledge 26 will result in the longitudinal opening of each receiving chamber continuing downward to the bottom end 22. Alternatively, this opening could cease at the ledge 26, with the ledge being expanded to cover the entirety of the bottom of the receiving chamber, such that the main body below the receiving chambers and above the bottom end 22 would have a substantially uninterrupted circular periphery.

It is noted that each of the receiving chambers, the main body 22 and the longitudinal openings of the receiving chambers may be slightly tapered, as shown in the drawings, to aide in release of the main body from a mold, in those cases where the main body is formed as a monolithic plastic unit.

The panel retainers 14 are adapted to connect to the main body 22 by the use of a chamber rods 28. Each chamber rod associated with each of the panel retainers has a generally cylindrical form, and is sized to be received within any one of the receiving chambers 24. In particular, while the chamber rods have a diameter which will allow a sliding fit within the receiving chambers, the diameter is greater than the width of the longitudinal opening of the receiving chambers. As such, when a chamber rod 28 has been placed within a receiving chamber 24 by passing the chamber rod downward past top end 20 into the receiving chamber, the chamber rod will be fixed against lateral movement out of the receiving chamber.

The panel retainers 14 are completed by the provision of a panel cup 30 connected to the chamber rod 28. Each panel cup includes a vertically extending substantially rectangular rear wall 32, a substantially horizontally extending and substantially rectangular bottom wall 34 connected to the rear wall 32 at a lower end thereof, and a pair of side walls 36 which are substantially planar and extend between the rear wall and bottom wall at the lateral edges thereof. Together the walls 32-36 define a partial enclosure which may support a lower corner of a panel 38 against downward movement, lateral movement and tipping. The panel cup is connected to the chamber rod at a laterally central location on the rear face of the rear wall 32 along a line substantially parallel to the longitudinal axis of the chamber rod.

The connection of the cup to the chamber rod is substantially a line contact, and as such has small angular extent on the outer circumference of the chamber rod. In particular, the angular extent of the connection of the panel cup is less than the angular extent of the longitudinal opening of each of the receiving chambers 24. This, combined with the center of each receiving chamber being spaced radially inward of the main body a distance less than the radius of the receiving chamber, allows the panel retainers 14 to pivot with respect to the main body.

In particular, as is best shown in FIG. 3, when the chamber rod 28 is received within a receiving chamber 24, the chamber rod, and thus the panel retainer 14, may rotate about the substantially coaxial longitudinal axes of the receiving chamber and chamber rod. This rotation will be limited by physical contract of the panel retainer 14 with the main body 12. For example the edges of the longitudinal opening of the receiving chamber may abut against the line of connection between the chamber rod and panel cup, or the rear wall of the panel cup may abut against the main body 12 at a position intermediate adjacent receiving chambers, as shown in FIG. 3. The amount of rotation may thus be determined by the geometry of the unit, and in this regard it is preferred that the unit be designed such that a panel retainer may have an approximately 90 degree rotation arc when received upon the main body 12.

Figure 5:
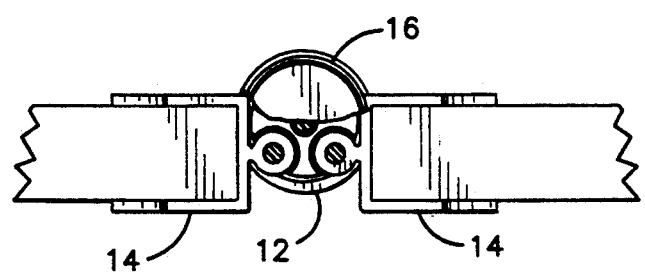
FIG. 5 is a detailed plan view in partial cross section of a framing unit according to the present invention, showing an alternative panel retainer configuration.

This provides various advantages as shown by comparison of FIGS. 3 and 5. For example, a pair of panel retainers may be placed in alternate ones of the receiving chambers of the main body, as shown in solid lines in FIG. 3, to receive panels 38 and thus form a continuous joint between parallel panels. Alternatively, one of the panel retainers may be moved such that the panel retainers are in adjacent receiving chambers and the panel retainers rotated to again allow panels 38 to be received and form a continuous joint between parallel panels, as shown in FIG. 5. Additionally, the panels need not extend from the main body at 90 degree increments, thus allowing adjacent panels to take virtually any angular orientation with respect to each other, as illustrated in FIG. 2. This is only possible with panel retainers which rotate.

Figures 6, 7:
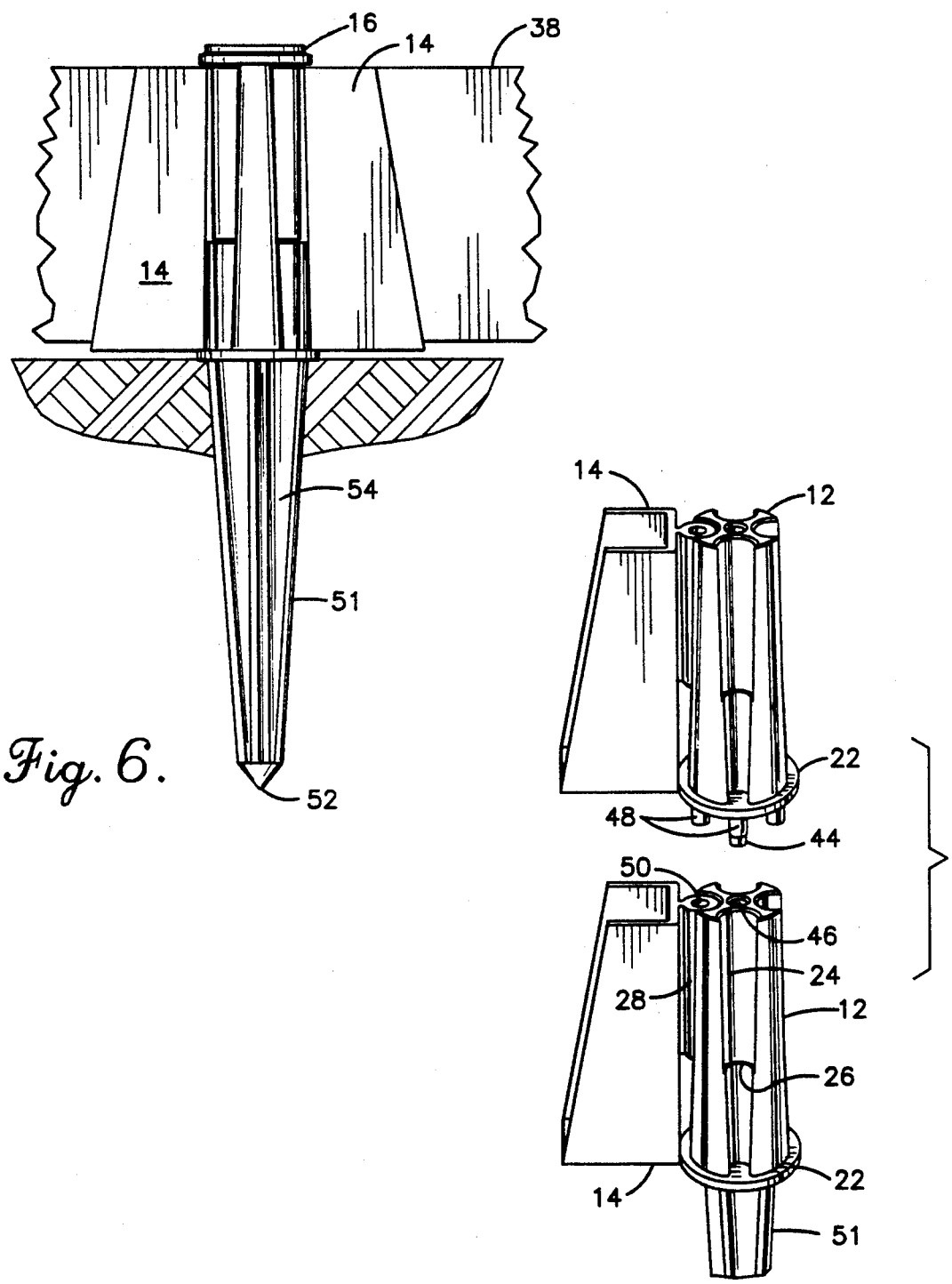
FIG. 6 is a side view of the framing unit of FIG. 5.
FIG. 7 is an exploded perspective view showing the stacking arrangement of framing units according to the present invention.

Comparison of FIGS. 3 and 5 shows that in the arrangement of FIG. 5 the lack of an intermediate receiving chamber may provide an improved aesthetic appearance from one side of the framing unit, as shown in FIG. 6. Additionally, as shown in FIG. 5 the main body does not extend beyond the lateral edge of the panel 38 on one side thereof. As such, a thin sheet of metal or other material may be placed between the panel retainers to form a substantially continuous line, which may be advantageous where the framing units and panels are employed as concrete forms.

The cap 16 may be provided with the framing unit to improve the esthetics thereof. Specifically, the cap may include a substantially planar lid 42 which rests upon the top end 20 of the main body and thus covers the receiving chambers and chamber rods from view. To maintain the lid in place, the cap may additionally include a central projection 44 extending outward from the lower face of lid 42 and adapted to be received within a mating central hole 46 in the main body which opens to the top end 20. The placement of the central projection within the central hole will thus block movement of the lid 42 in a plane parallel to the top end 20. To resist movement of the lid in the direction normal to the plane of top end 20, the weight of the lid itself could be the sole retaining means, or the projection 44 and hole 46 could be sized to provide an interference fit, could include a mating projection and ledge to form a snap fit, or could be retained by adhesives.

As is best shown in FIGS. 4 and 6, it is preferred that the outer diameter of the lid 42 be sized such that it does not extend beyond the rear wall 32 of the panel cup 30. Where this is the case there is no theoretical limit upon the height of panel 38 which may be received within the panel cup, although there will of course be practical limits. As a general rule, it is preferred that the panel 38 have a height substantially corresponding to that of the panel cups, as shown in FIG. 4, where the device is used as a concrete form or a landscape border. This is, of course, not limiting, and other sizes of panels, greater and smaller, may be used.

While the ledge 26 will serve to support the panel retainer and panel, there may be a slight tendency for the chamber rod 28 to rotate outward from the main body adjacent the ledge 26. This may be aggravated where the main body is formed with the taper to improve mold release as discussed above. To help prevent such rotation of the chamber rods out of the receiving chamber, the cap 16 may include rod projections 48 extending downward from the lower face of lid 42 in a manner similar to the central projection 44. A rod projection 48 will be provided for each of the receiving chambers, and be located at positions corresponding to the longitudinal axes of the receiving chambers. Thus, the rod projections 48 may be received within mating rod holes 50 formed through each of the chamber rods. As may be seen in FIG. 4, where such a cap 16 is employed the chamber rods will be securely retained while still allowing the desired rotation of the panel retainers with respect to the main body.

While several framing units may be arranged with panels 38 extending therebetween, as shown for example in FIG. 2, it may be readily seen that the means 18 securing against movement is required to retain the framing units in their relative position. The means 18 may take various forms depending upon the use of the framing unit, and whether it is used upon a fabricated floor or upon the ground. For example, the bottom end 22 could include a peripheral flange having a plurality of holes therethrough which could receive screws or nails to fix the main body to a wooden or concrete floor, with such a flange and the fasteners thus forming the means 18. Similarly, the central hole 46 could be formed as a through-hole having a reduced diameter lower portion such that a nail or screw could be inserted into the central hole to fix the framing unit to a wooden or concrete floor. However, it is typically the case that the framing unit according to the present invention will be used upon the ground per se.

In such situations it is preferred that the framing unit be formed with a means 18 in the form of an elongated stake as shown for example in FIGS. 1, 4, and 6. The stake may be tapered to a pointed free end 52, and may include a plurality of longitudinal faces or facets 54. Such faces will help to prevent rotation of the stake within the ground, and thus aide in preventing rotation of the main body. It is noted that when the framing unit is being installed by applying force to the top end 20 to force the stake 18 to be driven into the ground, precise orientation of the receiving chambers in the desired direction of the panels associated with such framing unit is not necessary. This is due to the ability of the panel retainers to be rotated with respect to the main body, such that slight angular misplacement of the main body may be readily accounted for by relative rotation of the panel retainers. As may be envisioned, this will greatly facilitate the use of the present framing units.

As is best illustrated in FIG. 7, the framing units may also be employed as modular elements in the vertical direction. In such situations a first set of the framing units may include means 18 securing against movement in the form of stakes 51, such that this first set of units is secured directly to the ground. The remaining sets of framing units may include means 18 securing against movement which take the form of a central projection 44 and plurality of rod projections 48 extending downward from the lower face of bottom end 22, in a manner similar to that of cap 16. In particular, the remaining sets of framing units will take the place of such caps, with the framing units being mounted one upon the other with the projections and holes 44-50 being in mating configuration to retain the framing units together. The uppermost set of framing units may, of course, be provided with caps 16 as described above to improve aesthetics.

In the stacked arrangement of FIG. 7 it may be readily seen that a plurality of panels may be arranged in the vertical direction. This will facilitate the building of certain structures, such as fences or compost bins. With specific reference to compost bins, panels 38 having a height less than that shown in FIGS. 4 and 6, and preferably one-half the height of the panel cups 30 may be associated with each panel retainer. This will result in a series of vertically spaced horizontally extending panels which may be formed in a bin configuration, such as shown in FIG. 2, with the panels providing support for the compost while the spacing between panels provides the necessary ventilation.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A modular framing unit, adapted for use with at least one other such framing unit, said framing units supporting a panel in an upright configuration therebetween, said framing unit comprising:

a main body having a longitudinal axis defining a main axis, a top end, a bottom end, and a periphery, and a plurality of peripherally spaced receiving chambers extending into said top end and each said receiving means having a lower end;

at least one panel retainer associated with said main body, said panel retainer having a chamber rod adapted to be received within any one of said receiving chambers in mating configuration, and a panel cup adapted to receive and support a lower edge portion of the panel, said chamber rod connected along a side of said panel cup;

means for securing said main body against movement relative to the ground;

a cap for application to said top end of the main body to cover said chambers, said cap having a plurality of rod projections extending therefrom at spaced positions corresponding to the spacing of said chambers; and a hole extending into said chamber rod at a location to receive one of said rod projections when said cap is applied to said top end of the main body.

2. A framing unit as in claim 1, wherein a longitudinal opening extends from each said receiving chamber through said main body along a radial direction of said main body containing said chamber, and extends to said top end, and wherein said panel cup is connected to said rod along a portion thereof, said portion being received within said longitudinal opening when said rod is received within said chamber, and wherein each of said receiving chambers is substantially cylindrical with a longitudinal axis of each said chamber substantially parallel to, and spaced from, said main axis, said rod being substantially cylindrical and having a diameter less than that of said chambers, whereby said rod, and thus said panel retainer, may rotate with respect to said receiving chamber when received therein.

3. A framing unit as in claim 2, wherein said longitudinal axis of each said chamber is spaced inward from said periphery of said main body along said radial direction by a distance less than the radius of said chamber, thereby forming said longitudinal opening.

4. A framing unit as in claim 3, wherein said panel cup includes a vertical rear wall having side edges and a bottom edge, a bottom wall extending horizontally outward from said bottom edge of said rear wall and having side edges, and a pair of side walls, each said side wall extending between associated ones of said side edges of said rear and said bottom walls, whereby side panel may rest upon said bottom wall and be restricted in movement by said rear and side walls.

5. A framing unit as in claim 1, wherein said means for securing said main body against movement comprises a stake extending from said bottom end of said main body parallel to said main axis and adapted to be driven into the earth.

6. A modular framing unit, adapted for use with at least one other such framing unit, said framing units supporting a panel in an upright configuration therebetween, said framing unit comprising:
- a main body having a longitudinal axis defining a main axis, a top end, a bottom end, and a periphery, and a plurality of peripherally spaced receiving chambers extending into said top end and each said receiving means having a lower end;
- at least one panel retainer associated with said main body, said panel retainer having a chamber rod adapted to be received within any one of said receiving chambers in mating configuration, and a panel cup adapted to receive and support a lower edge portion of the panel said chamber rod connected along a side of said panel cup,
- a central projection extending from said bottom end of said main body parallel to said main axis;
- a plurality of rod projections extending from said bottom end substantially parallel to said central projection at spaced positions corresponding to said longitudinal axes of said chambers;
- a central hole extending into said top end of said main body at a location to receive the central projection of an upper main body resting thereon; and
- a hole extending into said chamber rod at a location to receive one of said rod projections of the upper main body which rests thereon, thus restricting movement of said upper main body.

7. A framing unit as in claim 6, wherein a longitudinal opening extends from each said receiving chamber through said main body along a radial direction of said main body containing said chamber, and extends to said top end, and wherein said panel cup is connected to said rod along a portion thereof, said portion being received within said longitudinal opening when said rod is received within said chamber, and wherein each of said receiving chambers is substantially cylindrical with a longitudinal axis of each said chamber substantially parallel to, and spaced from, said main axis, said rod being substantially cylindrical and having a diameter less than that of said chambers, whereby said rod, and thus said panel retainer, may rotate with respect to said receiving chamber when received therein.

8. A framing unit as in claim 7, wherein said longitudinal axis of each said chamber is spaced inward from said periphery of said main body along said radial direction by a distance less than the radius of said chamber, thereby forming said longitudinal opening.

9. A framing unit as in claim 8, wherein said panel cup includes a vertical rear wall having side edges and a bottom edge, a bottom wall extending horizontally outward from said bottom edge of said rear wall and having side edges, and a pair of side walls, each said side wall extending between associated ones of said side edges of said rear and said bottom walls, whereby sid panel may rest upon said bottom wall and be restricted in movement by said rear and side walls.

10. A framing unit for supporting one end of a panel, said framing unit comprising:
- a body having top and bottom ends and presenting a periphery having a plurality of generally cylindrical chambers spaced apart thereon;
- at least one panel retainer for detachable connection with said body, said retainer having a generally cylindrical rod for close receipt in any one of said chambers in a manner permitting the rod to rotate in the chamber in which it is received, each chamber presenting an opening at the periphery of said body through which said panel retainer projects when the rod is received in the chamber;
- a panel cup on said panel retainer connected with said rod and being adapted to receive and support a lower edge of said one end of the panel, said cup being located out of the chamber which receives the rod and rotating with the rod to allow variation of the angular orientation of the panel relative to said body; and
- means for securing said body against movement relative to the ground.

* * * * *